Sept. 25, 1951  H. D. KORS  2,569,242
TIRE LIFTER
Filed May 26, 1947

INVENTOR.
Harry D. Kors
BY
ATTORNEY.

Patented Sept. 25, 1951

2,569,242

UNITED STATES PATENT OFFICE 2,569,242

TIRE LIFTER

Harry D. Kors, Independence, Kans.

Application May 26, 1947, Serial No. 750,567

1 Claim. (Cl. 254—131)

This invention has to do with tools of the kind adaptable to facilitate moving a relatively heavy object by increased leverage and more specifically relates to a tire lifting device, designed to aid in the replacing of an automobile tire upon the hub of the automobile when changes become necessary because of "flats" or other reasons.

The most important object of this invention is to provide an instrument for lifting tires having a main body portion in the form of an elongated bar and a fulcrum member mounted upon one face of the bar serving to support the latter when force is applied to one end of the bar to raise the other end and the work carried thereby.

Another important object of this invention is the provision of a tire lifting device having an elongated bar provided with a handle end and a working end, the latter of which is slightly curved to conform to the contour of the tire and the free end whereof is slightly tapered to permit wedging of the tool beneath the tire if such is desired.

A further object of this invention is the provision of a tire lifting tool having an elongated bar provided with a laterally extending loop on one face thereof and intermediate the ends of the bar to serve as a fulcrum support when the tool is placed in use.

Other objects of this invention include the provision of an upturned stop at the working end of the tool for preventing displacement of the tire supported thereby when the tool is placed in use; the way in which the fulcrum member is disposed in balanced relation on the bar to rockably support the same; and the manner in which the aforesaid leveled end of the bar serves to remove the hub cap of the wheel if such is desired.

Many minor objects will be made clear or become apparent during the course of the following specification, reference being had to the accompanying drawing, wherein.

It is common knowledge to those familiar with automobiles and particularly to those who have been experienced in the job of replacing an automobile tire when "flats" are encountered, that one of the most difficult problems is to raise the spare to a position where the plurality of holes in the wheel can be aligned and positioned upon the lugs. This problem is particularly enhanced in the case of women drivers because the spare tire is oftentimes much too heavy and furthermore, even in the case of men drivers, the tire replacing job becomes difficult because of necessary care to prevent soiling of the clothing.

The lifting tool about to be described is very simple to manufacture and inexpensive and may be made with little cost as an accessory along with the jack and other tools of the automobile.

Figure 1:
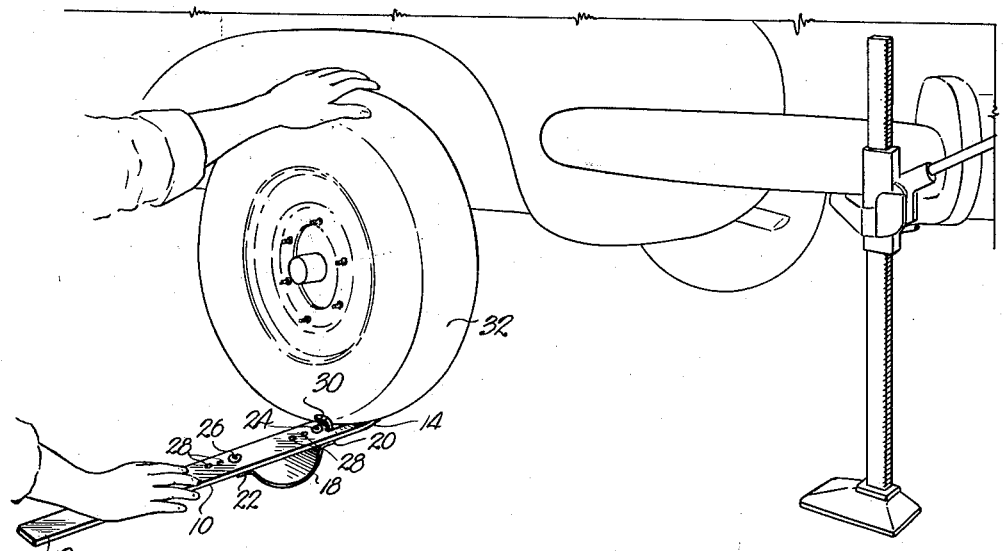
Fig. 1 is a fragmentary perspective view of an automobile and a perspective view of the tire lifting tool made in accordance with my present invention showing the same in operative use.
Figure 2:
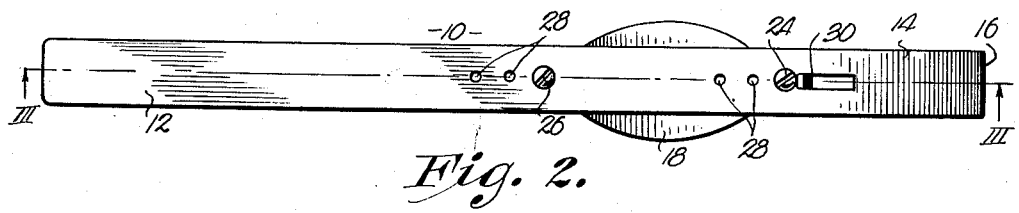
Fig. 2 is a top plan view thereof.
Figure 3:
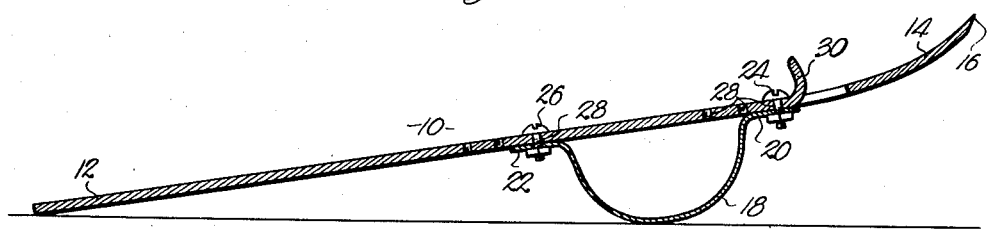
Fig. 3 is a substantially central, longitudinal cross-sectional view taken on line III—III of Fig. 2.

Referring particularly to the drawing, the numeral 10 designates generally an elongated bar. This bar 10 has a handle end 12 and a working end 14. This working end 14 is slightly curved, as clearly illustrated in Fig. 3 and the free end thereof is slightly beveled as at 16 to present a sharp edge for purposes hereinafter more fully described.

A fulcrum support is established for the bar 10 through the medium of a looped member 18. This member 18 is arcuate and substantially semi-circular in shape and is provided with a pair of outturned flanges or ears 20 and 22 for receiving a pair of bolts or the like 24 and 26 respectively. These bolts 24 and 26 pass through respective openings 28 formed in the bar 10 and through registering openings in the ears 20 and 22 for mounting the fulcrum member 18 upon the normally lowermost face of the bar 10. A plurality of openings 28 are formed in bar 10 to the end that fulcrum member 18 may be adjusted as desired to attain the correct leverage. An upturned stop 30 is formed in the bar 10 by stamping the same therefrom forwardly of the member 18 and adjacent the working end 14 of bar 10. It is preferred that the bight of the member 18 be appreciably wider than the width of the bar 10 to the end that the relatively wide supporting surface for the tool is presented when the same is placed in use.

In operation, after the "flat" tire has been removed and the spare has been rolled into place adjacent the automobile axle, the tool just described is moved into position where the spare tire 32 may be rolled upon the working end 14 of bar 10. It is readily seen that the tire 32 may then be easily raised by the operator pressing downwardly upon the handle 12 thereof. When the tire 32 has been thus raised, it is a simple matter for the user to align the openings within the spare wheel with the lugs to which the tire is to be affixed.

It is to be noted that when the tool is placed in use, no tipping will occur because of the relatively wide bight of the loop member 18 and that rocking action will occur because of the arcuate contour of member 18. This member 18 resting upon the ground, presents a base which will serve as a fulcrum support for the bar 10 and prevent sinking into the ground. The upturned portion 30 will prevent the bottom edge of the tire 32 from sliding along the bar 10 toward the handle portion 12 thereof.

If it is desired, the wheel 32 may be moved into place in alignment with the lugs of the axle upon which it is to be mounted and the sharpened end 16 of bar 10 merely wedged into position between the edge of tire 32 and the ground. This sharpened edge will adequately grip the tire and when handle portion 12 is moved downwardly, tire 32 may be easily raised. It is also noteworthy that this sharpened edge 16 may be used to remove the hub cap of the automobile tire, thus obviating the necessity of using a screw driver or other additional tool.

While the preferred form of tire tool has been shown and described, it is manifest that changes may be made without effecting the desired results. The loop 18 may be made by cutting a solid block from wood or other material to the desired shape and fastening the same to bar 10. Furthermore, plastic may be used to present a highly efficient yet relatively light lifter. If desired, welding of member 18 to bar 10 would eliminate use of the bolts 24 and 26.

From the foregoing, it is apparent that a tire lifting tool has been provided that is extremely efficient in its use and yet quite simple in construction and inexpensive in manufacture. While this tool has been designed for use with automobile tires as illustrated, it is manifest that many other uses may be made and modifications and changes provided for without departing from the spirit of this invention or scope of the appended claim.

Having thus described the invention, what is claimed as new and desired to be secured by Letters Patent is:

A device for lifting a tire and wheel assembly to and from a position in alignment with an automobile axle, said device comprising a single, elongated bar having a curved portion at one end thereof conforming with the transverse contour of the tire of said assembly, one face of the bar being beveled to present a sharpened edge; a laterally extending cut-out portion forming an integral part of said bar and presenting a tire-receiving stop on the other face of the bar adjacent the innermost end of said portion; a semi-circular fulcrum member on said one face of said bar, and extending from said portion toward the opposite end of the bar, the bight of said member being elliptical-shaped and appreciably wider than the bar, said member progressively decreasing in width as the ends of the legs thereof are approached; an out-turned flange on each leg respectively of the member; and means for releasably securing said flange to the bar.

HARRY D. KORS.

REFERENCES CITED

The following references are of record in the file of this patent:

UNITED STATES PATENTS

| Number | Name | Date |
|---|---|---|
| 1,857,500 | Davison | May 10, 1932 |
| 2,207,443 | Schneider | July 9, 1940 |

FOREIGN PATENTS

| Number | Country | Date |
|---|---|---|
| 320,796 | Great Britain | Oct. 24, 1929 |